United States Patent
Baba (10) Patent No.: US 10,638,009 B2
(45) Date of Patent: Apr. 28, 2020

(54) IMAGE READING DEVICE WITH MULTIPLE REGIONS IN VOLATILE MEMORY FOR PLURALITY OF DOCUMENT SHEETS

(71) Applicant: KYOCERA Document Solutions Inc., Osaka-shi, Osaka (JP)

(72) Inventor: Masaki Baba, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 16/116,761

(22) Filed: Aug. 29, 2018

(65) Prior Publication Data

US 2019/0075214 A1 Mar. 7, 2019

(30) Foreign Application Priority Data

Sep. 6, 2017 (JP) ................................. 2017-170799

(51) Int. Cl.
*H04N 1/00* (2006.01)
*G03G 15/00* (2006.01)
*G06F 3/12* (2006.01)

(52) U.S. Cl.
CPC ....... *H04N 1/00816* (2013.01); *G06F 3/1208* (2013.01); *G06F 3/1252* (2013.01); *H04N 1/00588* (2013.01); *H04N 1/00766* (2013.01); *H04N 1/00793* (2013.01); *G03G 15/607* (2013.01)

(58) Field of Classification Search
CPC ........... H04N 1/00816; H04N 1/00793; H04N 1/00588; H04N 1/00766; G06F 3/1208; G06F 3/1252
See application file for complete search history.

(56) References Cited

U.S. PATENT DOCUMENTS

| | | | |
|---|---|---|---|
| 9,578,194 B2 * | 2/2017 | Kawaguchi | ........ H04N 1/00649 |
| 2006/0203290 A1 * | 9/2006 | Ito | ........................ H04N 1/407 358/3.1 |
| 2007/0146808 A1 * | 6/2007 | Kudo | ................. H04N 1/00795 358/448 |

(Continued)

FOREIGN PATENT DOCUMENTS

JP 2016213907 A 12/2016

*Primary Examiner* — Juan M Guillermety
(74) *Attorney, Agent, or Firm* — Alleman Hall Creasman & Tuttle LLP (57) ABSTRACT

In an image reading device, a region securing portion secures six page regions in a storage region of a volatile memory. A first conveyance control portion permits a document sheet conveyance device to convey first three document sheets among a plurality of document sheets in response to securing of the six page regions. A data recording portion stores line image data with specified resolution in the six page regions for each page of the plurality of document sheets. An image processing portion moves the plural pieces of the line image data in sequence from the page regions to a work region, and transfers post-processing data to another device. A second conveyance control portion permits the document sheet conveyance device to convey a fourth document sheet and onward among the plurality of document sheets one at a time in sequence following conveyance of the first three document sheets.

2 Claims, 6 Drawing Sheets

(56) References Cited

U.S. PATENT DOCUMENTS

| | | | |
|---|---|---|---|
| 2008/0130064 A1* | 6/2008 | Sato | H04N 1/2032 358/474 |
| 2008/0212115 A1* | 9/2008 | Konishi | H04N 1/2166 358/1.9 |
| 2010/0188679 A1* | 7/2010 | Nakagawa | H04N 1/00482 358/1.12 |
| 2016/0127588 A1* | 5/2016 | Hayakawa | H04N 1/00795 358/498 |
| 2016/0309049 A1* | 10/2016 | Tagami | H04N 1/00766 |
| 2017/0187917 A1* | 6/2017 | Tanaka | H04N 1/00766 |

* cited by examiner

IMAGE READING DEVICE WITH MULTIPLE REGIONS IN VOLATILE MEMORY FOR PLURALITY OF DOCUMENT SHEETS

INCORPORATION BY REFERENCE

This application is based upon and claims the benefit of priority from the corresponding Japanese Patent Application No. 2017-170799 filed on Sep. 6, 2017, the entire contents of which are incorporated herein by reference.

BACKGROUND

The present disclosure relates to an image reading device and an image processing apparatus that are capable of performing processing at high speeds by effectively using a volatile memory.

In general, an image reading device includes a document sheet conveyance device and two reading devices. The document sheet conveyance device conveys a plurality of document sheets in sequence along a conveyance path. During a both-side reading process, the two reading devices read images from two surfaces of a document sheet at different positions in the conveyance path and output a plurality of pieces of line image data corresponding to the two surfaces in sequence, respectively.

When the image reading device performs a process of generating various types of image data from the plurality of pieces of line image data, processing-target data is primarily stored in a volatile memory with a fast access speed.

Each time a necessary piece of image data is generated, the generated piece of image data is transferred from the volatile memory to another device such as a secondary storage device, and after the image data becomes unnecessary, the image data is deleted from the volatile memory.

In addition, it is known that when the both-side reading process is performed, first image data is written into a region in a storage region of an image memory, and a writing start position of second image data is set after the region of the first image data. Subsequently, the second image data is written into the region of the image memory after the first image data is read therefrom.

SUMMARY

An image reading device according to an aspect of the present disclosure includes a document sheet conveyance device, two reading devices, a volatile memory, and a processor. The document sheet conveyance device is configured to convey a plurality of document sheets in sequence along a conveyance path. The two reading devices are configured to read images from two surfaces of each of the document sheets at different positions in the conveyance path and output a plurality of pieces of line image data corresponding to the two surfaces in sequence, respectively. The volatile memory is configured to primarily store the plurality of pieces of line image data whose resolution has been adjusted to a predetermined specified resolution. The processor is configured to execute data processing while accessing the volatile memory. The processor includes a region securing portion, a first conveyance control portion, a data recording portion, an image processing portion, and a second conveyance control portion. The region securing portion is configured to secure six page regions in a storage region of the volatile memory, each of the six page regions being configured to store line image data of one page of a document sheet. The first conveyance control portion is configured to permit the document sheet conveyance device to convey first three document sheets among the plurality of document sheets in response to securing of the six page regions. The data recording portion is configured to store plural pieces of the line image data that are obtained in sequence, in the six page regions for each page of the plurality of document sheets. The image processing portion is configured to move the plural pieces of the line image data in sequence from the page regions to a work region that is provided in the storage region of the volatile memory as a region other than the page regions, generate post-processing data by performing predetermined data processing on the plural pieces of the line image data in the work region to, and transfer the post-processing data to another device. The second conveyance control portion is configured to permit the document sheet conveyance device to convey a fourth document sheet and onward among the plurality of document sheets one at a time in sequence following conveyance of the first three document sheets.

An image processing apparatus according to another aspect of the present disclosure includes the image reading device and an image forming device that is configured to form, on a sheet, an image based on image data obtained by the image reading device.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 7A to FIG. 7E show a plurality of states of an ADF when the image reading device executes the high-speed reading process in the image processing apparatus according to the embodiment.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

[Configuration of Image Processing Apparatus 10]

An image processing apparatus 10 of the present embodiment executes an image reading process and an image outputting process, wherein in the image reading process, an image is read from each document sheet 91, and the image outputting process is executed based on a plurality of pieces of line image data obtained in the image reading process.

Figure 1:
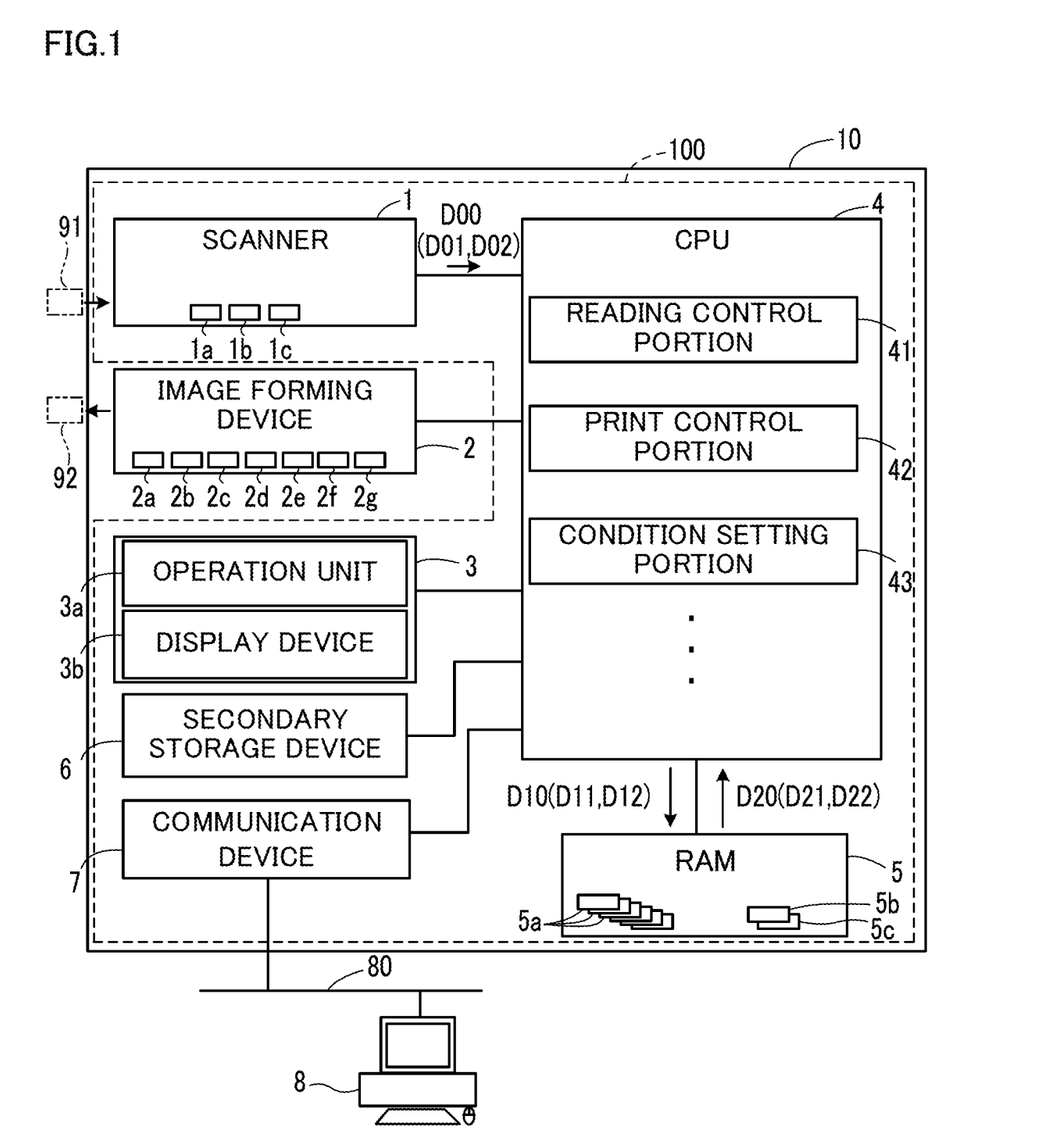
FIG. 1 is a block diagram of an image processing apparatus according to an embodiment of the present disclosure.

As shown in FIG. 1, the image processing apparatus 10 includes a scanner 1, an image forming device 2, a user interface unit 3, a CPU 4, a RAM (Random Access Memory) 5, a secondary storage device 6, and a communication device 7, wherein the portions of the image processing apparatus 10 other than the image forming device 2 constitute an image reading device 100.

The user interface unit 3 is a user interface that includes an operation unit 3a and a display device 3b. The operation unit 3a is configured to receive user operations, and includes a touch panel, for example. The display device 3b is configured to display an image, and includes, for example, a display panel such as a liquid crystal display panel.

The communication device 7 is a communication interface device configured to perform communication with other apparatuses such as a terminal apparatus 8. The CPU 4 performs data transmission and reception with the other apparatuses all via the communication device 7.

The secondary storage device 6 is a computer-readable nonvolatile storage device. The secondary storage device 6 is configured to store programs and various types of data. For example, a flash memory and/or a hard disk drive is adopted as the secondary storage device 6.

The RAM 5 is an example of a volatile storage device configured to primarily store a program executed by the CPU 4, and data that is output and referred to while the program is executed by the CPU 4. The RAM 5 is a storage device with a higher-speed data access than the secondary storage device 6.

As shown in FIG. 1, the scanner 1 is a device configured to execute the image reading process of reading an image from a document sheet 91. The scanner 1 includes an ADF (Automatic Document Feeder) 1a, a first reading device 1b, and a second reading device 1c.

Figure 2:
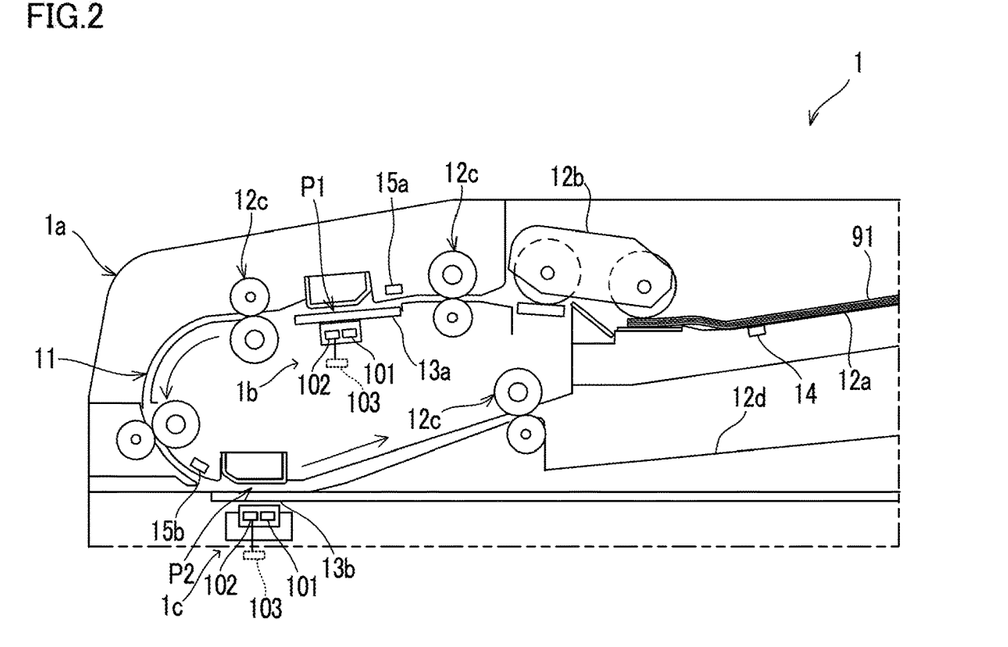
FIG. 2 is a configuration diagram of an image reading device included in the image processing apparatus according to the embodiment.

As shown in FIG. 2, the ADF 1a is a device configured to convey a plurality of document sheets 91 in sequence along a predetermined conveyance path 11. The ADF 1a is an example of a document sheet conveyance device.

The ADF 1a includes a document sheet tray 12a, a document sheet feed mechanism 12b, a plurality of document sheet conveyance rollers 12c, a discharge tray 12d, a first contact glass 13a, a second contact glass 13b, a placed-document-sheet sensor 14, a first document sheet sensor 15a, and a second document sheet sensor 15b.

The plurality of document sheets 91 are placed on the document sheet tray 12a. The placed-document-sheet sensor 14 is configured to detect one or more document sheets 91 when they are present on the document sheet tray 12a.

The document sheet feed mechanism 12b is configured to feed the document sheets 91 on the document sheet tray 12a one by one to the conveyance path 11. The plurality of document sheet conveyance rollers 12c convey the document sheets 91 fed by the document sheet feed mechanism 12b, along the conveyance path 11 and discharge the document sheets 91 from the conveyance path 11 to the discharge tray 12d.

The first document sheet sensor 15a is configured to detect a document sheet 91 when the document sheet 91 reaches a position that goes back from a first position P1 to an upstream side by a predetermined reference length in the conveyance path 11. The second document sheet sensor 15b is configured to detect a document sheet 91 when the document sheet 91 reaches a position that goes back from a second position P2 to the upstream side by the reference length in the conveyance path 11.

The second position P2 is located on a downstream side of the first position P1 in the conveyance path 11. It is noted that the upstream side and the downstream side respectively mean an upstream side and a downstream side in a conveyance direction of the document sheet 91 in the conveyance path 11.

The time required for the document sheet 91 to be conveyed by the reference length along the conveyance path 11 is known. Therefore, it can be said that the first document sheet sensor 15a and the second document sheet sensor 15b detect timings at which the document sheet 91 conveyed along the conveyance path 11 reaches the first position P1 and the second position P2, respectively.

The first reading device 1b reads an image from a first surface of a document sheet 91 at the first position P1 in the conveyance path 11, and outputs in sequence a plurality of pieces of first line image data D01 corresponding to the first surface of the document sheet 91. The second reading device 1c reads an image from a second surface of the document sheet 91 at the second position P2 in the conveyance path 11, and outputs in sequence a plurality of pieces of second line image data D02 corresponding to the second surface of the document sheet 91.

In the following description, the first line image data D01 and the second line image data D02 may be referred to as primary line image data D00. The primary line image data D00 is image data with a rated resolution, namely the maximum resolution, of the first reading device 1b and the second reading device 1c.

That is, the two reading devices 1b and 1c read images from two surfaces of the document sheet 91 at different positions in the conveyance path 11 and output a plurality of pieces of primary line image data D00 corresponding to the two surfaces of the document sheet 91 in sequence, respectively.

In the present embodiment, the first surface is a rear surface of the document sheet 91, and the second surface is a front surface of the document sheet 91. It is noted that the first surface may be the front surface of the document sheet 91, and the second surface may be the rear surface of the document sheet 91.

Each of the first reading device 1b and the second reading device 1c includes a light source 101, an image sensor 102, and an AFE (Analog Front End) 103.

The light source 101 emits light toward the document sheet 91 while the document sheet 91 is conveyed by the ADF 1a. It is noted that the light source 101 of the first reading device 1b emits light toward the document sheet 91 through the first contact glass 13a. Similarly, the light source 101 of the second reading device 1c emits light toward the document sheet 91 through the second contact glass 13b.

When the ADF 1a feeds a document sheet 91, the light source 101 emits light for scanning the document sheet 91. The image sensor 102 receives light reflected on a one-line region of each document sheet 91, and outputs, as an image signal, a detection signal representing an amount of received light.

The AFE 103 converts the image signal to a digital piece of primary line image data D00, and outputs a plurality of pieces of primary line image data D00 in sequence. As described so far, the image reading process of the present embodiment is a both-side reading process in which images are read line by line from both sides (two opposite surfaces) of the document sheets 91 that are conveyed in sequence by the ADF 1a, and a plurality of pieces of primary line image data D00 are output in sequence.

The image forming device 2 shown in FIG. 1 executes a print process of forming an image on a sheet 92 by a predetermined system such as an electrophotographic system or an ink jet system.

When the image processing apparatus 10 executes a copy job, the image forming device 2 forms an image on the sheet 92 based on image data that is obtained by the image reading device 100. That is, the image forming device 2 executes the print process based on print data generated from the first line image data D01 and/or the second line image data D02 of at least one page obtained by the image reading device 100.

In addition, when the image processing apparatus 10 executes a print job, the image forming device 2 executes the print process based on print job data received from the terminal apparatus 8 via the communication device 7.

For example, in a case where the image forming device 2 executes the print process by the electrophotographic system, the image forming device 2 includes a sheet conveyance mechanism 2a, a photoconductor 2b, a charging device 2c, a laser scanning unit 2d, a developing device 2e, a transfer device 2f, and a fixing device 2g.

The sheet conveyance mechanism 2a conveys the sheet 92. The charging device 2c charges the surface of the photoconductor 2b. The laser scanning unit 2d writes an electrostatic latent image on the charged surface of the photoconductor 2b.

The developing device 2e develops the electrostatic latent image on the photoconductor 2b with toner to form a toner image. The transfer device 2f transfers the toner image from the photoconductor 2b to the sheet 92. The fixing device 2g fixes the toner image to the sheet 92 by heating the toner image on the sheet 92.

The CPU 4 is an example of a processor that performs data processing while accessing the RAM 5. For example, the CPU 4 operates as a reading control portion 41, a print control portion 42, and a condition setting portion 43 by executing programs stored in advance in the secondary storage device 6.

The reading control portion 41 controls the scanner 1 to execute the image reading process. The print control portion 42 controls the image forming device 2 to execute the print process.

The condition setting portion 43 sets job conditions in accordance with operations performed on the operation unit 3a. Furthermore, the condition setting portion 43 displays the set job conditions on the display device 3b, and delivers the job conditions to the reading control portion 41 and the print control portion 42. For example, the condition setting portion 43 delivers the job conditions to the reading control portion 41 and the print control portion 42 via the secondary storage device 6 by storing the job conditions in the secondary storage device 6.

The job conditions include: processing conditions for the image reading process that are delivered to the reading control portion 41; and processing conditions for the print process that are delivered to the print control portion 42.

The processing conditions for the image reading process include "specified resolution", "first image reading mode", "second image reading mode", and "document sheet size". As described below, the reading control portion 41 executes a resolution adjustment process to convert the primary line image data D00 with the rated resolution to the secondary line image data D10 with a predetermined specified resolution.

The above-mentioned document sheet size represent the size of the sheet 92 placed on the document sheet tray 12a. It is noted that the ADF 1a may include a size detection sensor for detecting the document sheet size. In that case, the size detection sensor automatically sets the document sheet size.

The secondary line image data D10 includes first adjusted line image data D11 and second adjusted line image data D12, wherein the first adjusted line image data D11 corresponds to the first line image data D01, and the second adjusted line image data D12 corresponds to the second line image data D02.

Furthermore, the reading control portion 41 performs a process for generating various types of output image data D20 from the secondary line image data D10. The output image data D20 includes first output image data D21 and second output image data D22, wherein the first output image data D21 corresponds to the first adjusted line image data D11, and the second output image data D22 corresponds to the second adjusted line image data D12.

For example, the first output image data D21 may be first output band data in which a plurality of pieces of first adjusted line image data D11 are integrated as a set of data. Similarly, the second output image data D22 may be second output band data in which a plurality of pieces of second adjusted line image data D12 are integrated as a set of data.

During execution of a process for generating various types of output image data D20 from a plurality of pieces of secondary line image data D10, processing-target data is primarily stored in the RAM 5 with a high-speed data access.

The RAM 5 is an example of a volatile memory in which the secondary line image data D10 is primarily stored, wherein the secondary line image data D10 is formed by adjusting the resolution of the primary line image data D00 to the specified resolution.

Each time a necessary piece of output image data D20 is generated, the generated piece of output image data D20 is transferred from the RAM 5 to another device such as the secondary storage device 6, and the secondary line image data D10 that has become unnecessary is deleted from the RAM 5.

The first image reading mode is a processing condition specifying a one-side reading mode or a both-side reading mode, wherein when the one-side reading mode is specified, the image reading process is performed on only one surface of the document sheet 91, and when the both-side reading mode is specified, the image reading process is performed on the two surfaces of the document sheet 91.

The second reading mode is a processing condition specifying a memory-saving priority mode or a speed priority mode. When the memory-saving priority mode is specified, the image reading process is executed by giving priority to reduced use size of the RAM 5 than to the speed. When the speed priority mode is specified, the image reading process is executed by giving priority to the speed than to the use size of the RAM 5.

In addition, the processing conditions for the print process include a print type condition specifying a color print process or a monochrome print process.

The print type condition and the specified resolution in the job conditions are examples of an image output condition. In addition, the CPU 4 that operates as the condition setting portion 43 is an example of a condition setting device.

It is noted that, instead of the CPU 4, another processor such as a DSP (Digital Signal Processor) may be adopted so as to operate as the reading control portion 41, the print control portion 42, and the condition setting portion 43.

Meanwhile, the both-side reading process is desirably executed at as high a speed as possible under the restriction of a usable storage region in the RAM 5.

The image reading device 100 executes the both-side reading process at as high a speed as possible under the restriction of a usable storage region in the RAM 5 by executing a high-speed reading process that is described below.

Figure 3:
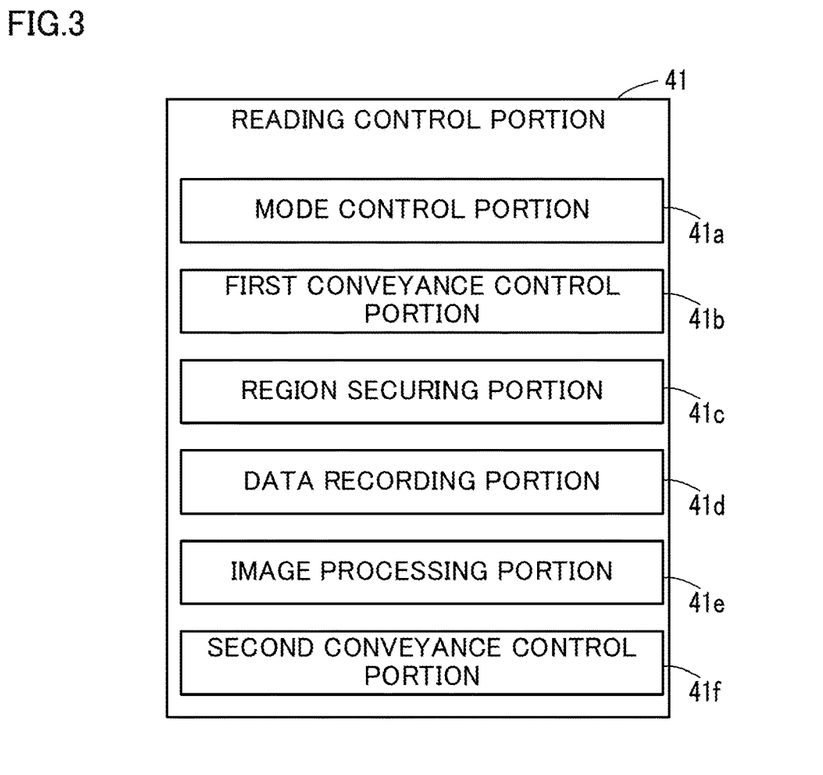
FIG. 3 is a block diagram of a reading control portion included in the image processing apparatus according to the embodiment.

As shown in FIG. 3, the reading control portion 41 of the present embodiment includes a mode control portion 41*a*, a first conveyance control portion 41*b*, a region securing portion 41*c*, a data recording portion 41*d*, an image processing portion 41*e*, and a second conveyance control portion 41*f*.

That is, the CPU 4 that executes the programs preliminarily stored in the secondary storage device 6 includes the mode control portion 41*a*, the first conveyance control portion 41*b*, the region securing portion 41*c*, the data recording portion 41*d*, the data recording portion 41*d*, and the second conveyance control portion 41*f*.

The mode control portion 41*a* starts a memory-saving reading process or the high-speed reading process by executing a reading mode control that is described below.

The memory-saving reading process is the image reading process that is executed with the minimum use size of the RAM 5. On the other hand, the high-speed reading process is the image reading process that is executed at the highest speed in the image reading device 100 while restricting as much use size of the RAM 5 as possible.

[Reading Mode Control]

Figure 4:
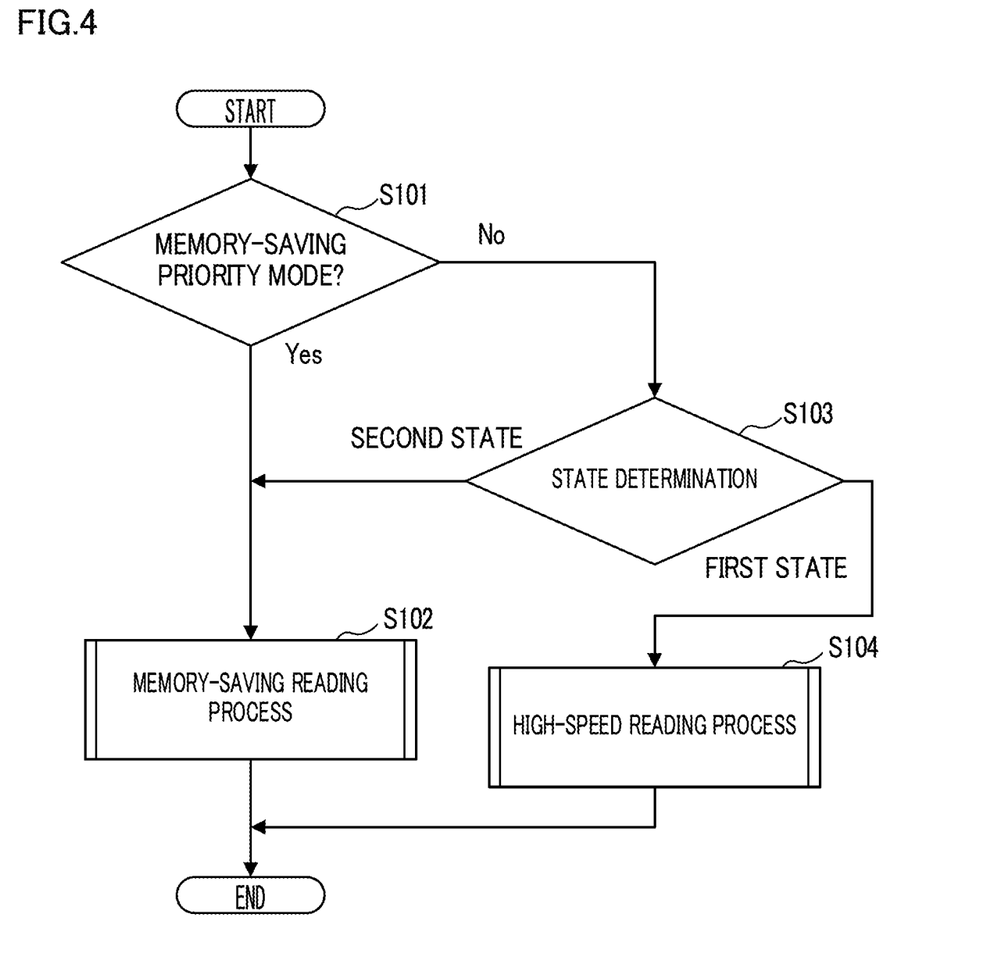
FIG. 4 is a flowchart showing an example of a procedure of a reading mode control in the image processing apparatus according to the embodiment.

The following describes an example of the procedure of the reading mode control with reference to the flowchart shown in FIG. 4.

The mode control portion 41*a* starts executing the reading mode control when a predetermined reading start operation is performed on the operation unit 3*a* in a state where the both-side reading mode has been set as the first reading mode in advance. In the following description, S101, S102, . . . are identification signs representing a plurality of steps of the reading mode control.

<Step S101>

In the reading mode control, the mode control portion 41*a* selects a process to be executed next, depending on which of the memory-saving priority mode or the speed priority mode has been set as the second reading mode.

The mode control portion 41*a* moves the process to step S102 when the memory-saving priority mode has been set as the second reading mode. On the other hand, the mode control portion 41*a* moves the process to step S103 when the speed priority mode has been set as the second reading mode.

<Step S102>

In step S102, the region securing portion 41*c* starts the memory-saving reading process. When the memory-saving reading process is started, the mode control portion 41*a* ends the reading mode control.

<Step S103>

In step S103, the mode control portion 41*a* determines which of a first state or a second state the RAM 5 is in.

It is noted that when six regions corresponding to the specified resolution can be secured in the storage region of the RAM 5, the RAM 5 is determined to be in the first state, and otherwise, the RAM 5 is determined to be in the second state. It is noted that the mode control portion 41*a* executing the process of step S103 is an example of a determination portion.

At the start of the reading mode control, the RAM 5 has at least as much a free capacity as a total of a maximum saving region size, a maximum work region size, and a margin size.

The maximum saving region size is a size of the secondary line image data D10 with the rated resolution of two pages that correspond to the two surfaces of a document sheet 91 of the maximum size that the scanner 1 can process.

The maximum work region size is a size of the storage region of the RAM 5 that is necessary for performing data processing of converting the secondary line image data D10 with the rated resolution to the output image data D20. The margin size is a size of the storage region of the RAM 5 that is necessary for the processes other than the image reading process.

For example, the mode control portion 41*a* derives a saving region size and a work size from a combination of the specified resolution and the document sheet size. In this case, when the RAM 5 has as much a free capacity as a total of the maximum saving region size, the maximum work region size, and the margin size, the mode control portion 41*a* determines that the RAM 5 is in the first state. Otherwise, the mode control portion 41*a* determines that the RAM 5 is in the second state.

The saving region size is a size of the secondary line image data D10 with the specified resolution of six pages corresponding to the two surfaces multiplied by three document sheets 91 of the document sheet size that has been set in advance as a processing condition for the image reading process.

The work region size is a size of the storage region of the RAM 5 that is necessary for performing data processing of converting the secondary line image data D10 with the specified resolution to the output image data D20. For example, the work region size may be a size of the secondary line image data D10 with the specified resolution of two pages corresponding to the two surfaces of a document sheet 91 of the document sheet size.

On the other hand, a determination rule may be set in advance based on a combination of the specified resolution and the document sheet size, and the mode control portion 41*a* may determine which of the first state or the second state the RAM 5 is in, based on the determination rule.

For example, the determination rule may be set such that the RAM 5 is determined to be in the first state when a value obtained by multiplying an area ratio of the document sheet size to the maximum size by a ratio of the specified resolution to the rated resolution, is less than 33%, and otherwise, the RAM 5 is determined to be in the second state.

The mode control portion 41*a* moves the process to step S104 upon determining that the RAM 5 is in the first state, and moves the process to step S102 upon determining that the RAM 5 is in the second state.

<Step S104>

In step S104, the region securing portion 41c starts the high-speed reading process. When the high-speed reading process is started, the mode control portion 41a ends the reading mode control.

[High-Speed Reading Process]

Figure 5:
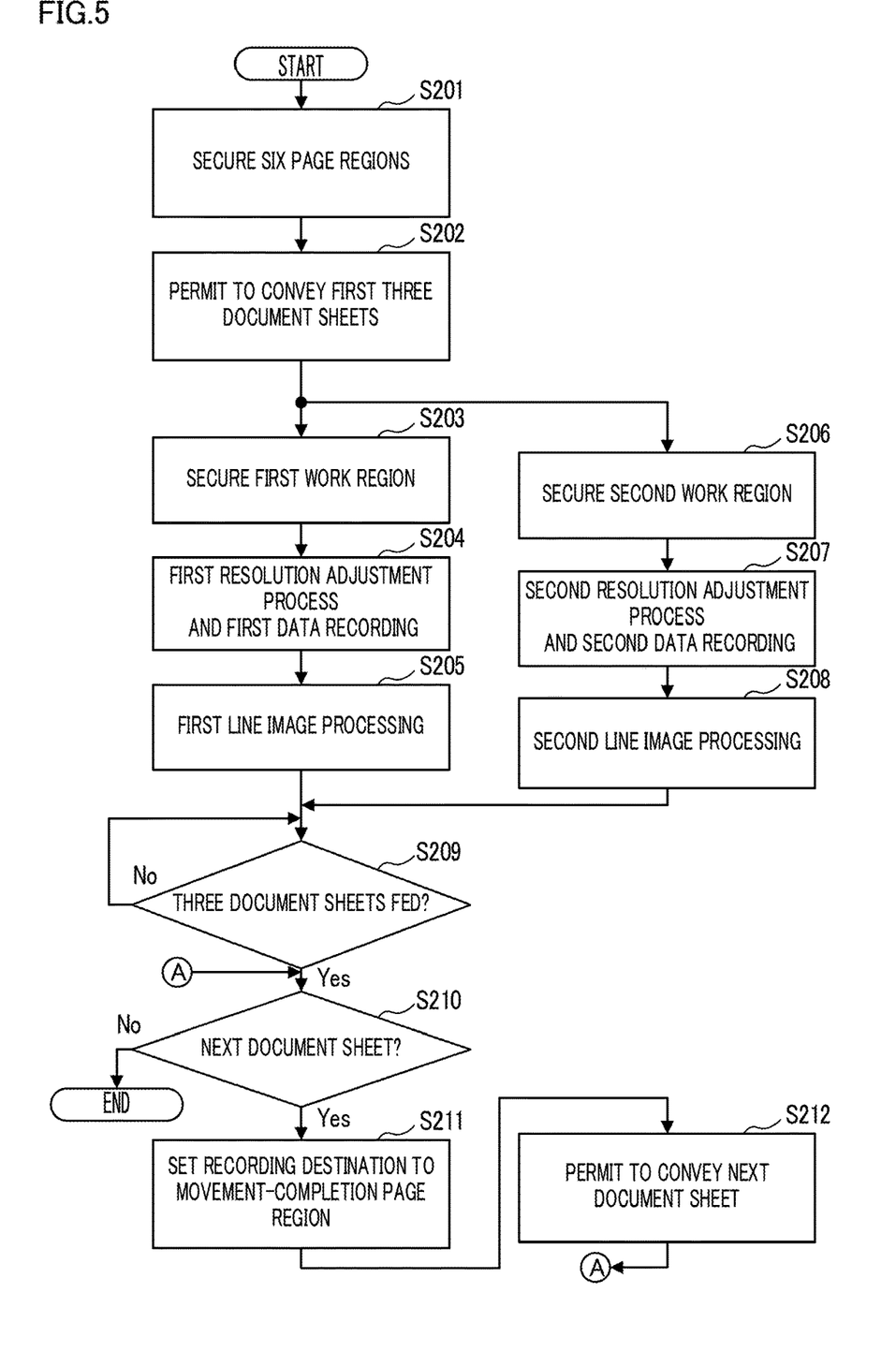
FIG. 5 is a flowchart showing an example of a procedure of a high-speed reading process in the image processing apparatus according to the embodiment.

The following describes an example of the procedure of the high-speed reading process with reference to the flowchart shown in FIG. 5. In the following description, S201, S202, . . . are identification signs representing a plurality of steps of the high-speed reading process.

<Step S201>

In step S201, in the high-speed reading process, the region securing portion 41c secures six page regions 5a in the storage region of the RAM 5 (see FIG. 1). Each of the page regions 5a is configured to store the first line image data D01 or the second line image data D02 of one page of the document sheet 91.

A total size of the six page regions 5a is the saving region size that is described above in connection with the process of step S103 in FIG. 4.

Three of the six page regions 5a constitute a first surface data saving region in which three pages of the first adjusted line image data D11 corresponding to first surfaces of three consecutive document sheets 91 are primarily stored. The other three of the six page regions 5a constitute a second surface data saving region in which three pages of the second adjusted line image data D12 corresponding to second surfaces of three consecutive document sheets 91 are primarily stored.

For example, when the size of the document sheets is A4 and the specified resolution is 200 dpi, the size of each page region 5a is equivalent to the size of a plurality of pieces of the first line image data D01 that are obtained from one page of document sheet 91 for the resolution of 200 dpi. Here, one page of the document sheet 91 that corresponds to the plurality of pieces of the first line image data D01 is the first surface of the document sheet 91.

It goes without saying that the size of the plurality of pieces of the first line image data D01 obtained from one page of document sheet 91 is the same as the size of a plurality of pieces of the second line image data D02 obtained from one page of document sheet 91. Here, one page of document sheet 91 that corresponds to the plurality of pieces of the second line image data D02 is the second surface of the document sheet 91.

Upon securing the six page regions 5a in the storage region of the RAM 5, the region securing portion 41c moves the process to step S202.

<Step S202>

In response to the securing of the six page regions 5a, the first conveyance control portion 41b permits the ADF 1a to convey first three document sheets 91 among a plurality of document sheets 91. The ADF 1a conveys the first three document sheets 91 on the document sheet tray 12a at predetermined time intervals in sequence.

The first conveyance control portion 41b moves the process from step S202 to step S203 and to step S206.

<Step S203>

In step S203, the region securing portion 41c secures a first work region 5b in the storage region of the RAM 5 as a region other than the six page regions 5a. Subsequently, the region securing portion 41c moves the process to step S204.

The first work region 5b is necessary for data processing of converting the first adjusted line image data D11 with the specified resolution to the first output image data D21. For example, the size of the first work region 5b may be a total of a plurality of pieces of the first line image data D01 that are obtained from one page of the document sheet 91.

<Step S204>

In step S204, the data recording portion 41d executes a first resolution adjustment process and a first data recording process.

In the first resolution adjustment process, a plurality of pieces of the first line image data D01 that are obtained in sequence from when the document sheet 91 reached the first position P1, are converted into the first adjusted line image data D11 with the specified resolution.

It is noted that the timing at which the document sheet 91 reaches the first position P1 is detected by the first document sheet sensor 15a.

In the first data recording process, the plurality of pieces of the first adjusted line image data D11 that were obtained in sequence in the first resolution adjustment process, are stored in the RAM 5. In the first data recording process, the data recording portion 41d stores the first adjusted line image data D11 in the first surface data saving region in the six page regions 5a of the RAM 5 for each page of the plurality of document sheets 91.

<Step S205>

In step S205, the image processing portion 41e executes first line image processing in parallel with the process of step S204.

The data recording portion 41d and the image processing portion 41e execute the processes of steps S204 and S205 in sequence with respect to a plurality of pieces of the first adjusted line image data D11 for each of the first surfaces of the document sheets 91 conveyed in sequence. This allows the data recording portion 41d and the image processing portion 41e to execute the processes of steps S204 and S205 with respect to a plurality of pieces of the first adjusted line image data D11 that are obtained from all document sheets 91 conveyed by the ADF 1a.

On the other hand, the first conveyance control portion 41b executes the process of step S209 that is described below, in parallel with the processes of steps S204 and S205 executed by the data recording portion 41d and the image processing portion 41e.

In the first line image processing, the image processing portion 41e moves a plurality of pieces of the first adjusted line image data D11 in sequence from the page regions 5a to the first work region 5b in the RAM 5. Furthermore, the image processing portion 41e generates the first output image data D21 as post-processing data by performing predetermined data processing on the first adjusted line image data D11 in the first work region 5b. Furthermore, the image processing portion 41e transfers the generated first output image data D21 from the RAM 5 to another device.

For example, the image processing portion 41e transfers the first output image data D21 from the RAM 5 to the image forming device 2, the secondary storage device 6, or the communication device 7 depending on the type of the job.

<Step S206>

On the other hand, in step S206, the region securing portion 41c secures a second work region 5c in the storage region of the RAM 5. The second work region 5c is other than the six page regions 5a and the first work region 5b. Subsequently, the region securing portion 41c moves the process to step S207.

The second work region 5c is necessary for data processing of converting the second adjusted line image data D12 with the specified resolution to the second output image data D22. For example, the size of the second work region 5c may be a total of a plurality of pieces of the second line image data D02 that are obtained from one page of the document sheet 91.

<Step S207>

In step S207, the data recording portion 41d executes a second resolution adjustment process and a second data recording process.

In the second resolution adjustment process, a plurality of pieces of the second line image data D02 obtained in sequence from a point in time when the document sheet 91 reached the second position P2 are converted into the second adjusted line image data D12 with the specified resolution.

It is noted that, as described above, the timing at which the document sheet 91 reaches the second position P2 is detected by the second document sheet sensor 15b.

In the second data recording process, the plurality of pieces of the second adjusted line image data D12 that are obtained in sequence in the second resolution adjustment process, are stored in the RAM 5. In the second data recording process, the data recording portion 41d stores the second adjusted line image data D12 in the second surface data saving region provided in the six page regions 5a of the RAM 5 for each page of the plurality of document sheets 91.

<Step S208>

In step S208, the image processing portion 41e executes second line image processing in parallel with the process of step S207.

The data recording portion 41d and the image processing portion 41e execute the processes of steps S207 and S208 in sequence with respect to a plurality of pieces of the second adjusted line image data D12 for each of the second surfaces of a plurality of document sheets 91 that are conveyed in sequence. This allows the data recording portion 41d and the image processing portion 41e to execute the processes of steps S207 and S208 with respect to a plurality of pieces of the second adjusted line image data D12 obtained from all document sheets 91 conveyed by the ADF 1a.

On the other hand, the first conveyance control portion 41b executes the process of step S209 that is described below, in parallel with the processes of steps S207 and S208 executed by the data recording portion 41d and the image processing portion 41e.

In the second line image processing, the image processing portion 41e moves a plurality of pieces of the second adjusted line image data D12 in sequence from the page regions 5a to the second work region 5c in the RAM 5. Furthermore, the image processing portion 41e generates the second output image data D22 as post-processing data by performing predetermined data processing on the second adjusted line image data D12 in the second work region 5c. Furthermore, the image processing portion 41e transfers the generated second output image data D22 from the RAM 5 to another device.

For example, the image processing portion 41e transfers the second output image data D22 from the RAM 5 to the image forming device 2, the secondary storage device 6, or the communication device 7 depending on the type of the job.

It is noted that first the processes of steps S204 and S205 are started at a timing when the document sheet 91 reaches the first position P1, and then the processes of steps S207 and S208 are started at a timing delayed from the timing of the document sheet 91 reaching the first position P1 by a time period that is required for the same document sheet 91 to move from the first position P1 to the second position P2.

<Step S209>

In step S209, the first conveyance control portion 41b waits until the first three document sheets 91 among the plurality of document sheets 91 are fed from the document sheet tray 12a.

The first conveyance control portion 41b moves the process to step S210 when the feeding of the first three document sheets 91 is completed.

It is noted however that, although not shown in FIG. 5, if a document sheet 91 stops to be detected on the document sheet tray 12a before the feeding of the first three document sheets 91 is completed, the first conveyance control portion 41b ends the high-speed reading process after the processes of steps S204, S205, S207 and S208 end.

<Step S210>

In step S210, the second conveyance control portion 41f determines whether or not a next document sheet 91 is present on the document sheet tray 12a with respect to the fourth document sheet 91 and onward. The document sheet 91 on the document sheet tray 12a is detected by the placed-document-sheet sensor 14.

Upon determining that a next document sheet 91 is present on the document sheet tray 12a with respect to the fourth document sheet 91 and onward, the second conveyance control portion 41f moves the process to step S211.

On the other hand, upon determining that a next document sheet 91 is not present on the document sheet tray 12a, the second conveyance control portion 41f ends the high-speed reading process after the processes of steps S204, S205, S207 and S208 end.

<Step S211>

In step S211, the data recording portion 41d sets a recording destination of the secondary line image data D10 that corresponds to the newly conveyed next document sheet 91, to a movement-completion page region in the RAM 5. Subsequently, the data recording portion 41d moves the process to step S212.

In the first data recording process and the second data recording process executed in steps S204 and S207, the data recording portion 41d stores the secondary line image data D10 corresponding to the newly conveyed next document sheet 91, in the movement-completion page region in the RAM 5.

The movement-completion page region is composed of some of the six page regions 5a from which all pieces of the secondary line image data D10 have been moved to the first work region 5b or the second work region 5c.

<Step S212>

In step S212, the second conveyance control portion 41f permits the ADF 1a to convey the next document sheet 91 with respect to the fourth document sheet 91 and onward. This allows the ADF 1a to convey the next document sheet 91 at a predetermined time interval from the precedingly conveyed document sheet.

Furthermore, the second conveyance control portion 41f moves the process from step S212 to the step S210.

As described above, when it is determined that the RAM 5 is in the first state, the region securing portion 41c secures six page regions 5a in the storage region of the RAM 5 (S201).

Furthermore, the first conveyance control portion 41b permits the ADF 1a to convey the first three document sheets 91 among a plurality of document sheets 91 in response to securing of six page regions 5a (S202).

Furthermore, the data recording portion 41d stores a plurality of pieces of the secondary line image data D10 that are obtained in sequence, in the six page regions 5a in the RAM 5, for each page of a plurality of document sheets 91 (S204, S207).

Furthermore, the image processing portion 41e moves the secondary line image data D10 stored in the page regions 5a in sequence to the first work region 5b and the second work region 5c that are other than the page regions 5a in the RAM 5 (S205, S208).

Furthermore, the image processing portion 41e performs predetermined data processing on the secondary line image data D10 in the first work region 5b and the second work region 5c, and transfers the output image data D20 on which the data processing has been performed, to other devices (S205, S208).

Subsequently, the second conveyance control portion 41f permits the ADF 1a to convey the fourth document sheet 91 and onward among the plurality of document sheets 91 one at a time in sequence following the first three document sheets 91 (S212).

In the following, the state of the ADF 1a during execution of the high-speed reading process is described with reference to FIG. 7A to FIG. 7E. In FIG. 7A to FIG. 7E, the plurality of document sheets 91 include a first document sheet 91a, a second document sheet 91b, a third document sheet 91c, and a fourth document sheet 91d.

Figure 7A:
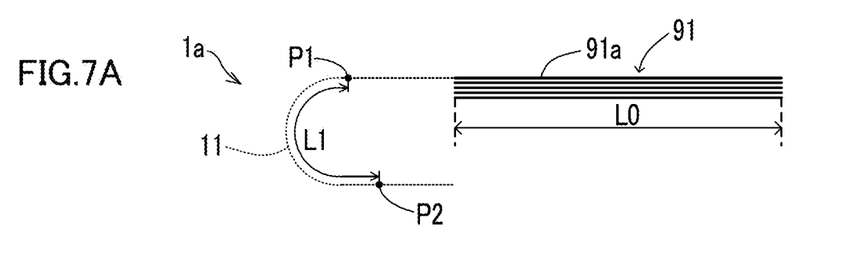
FIG. 7A shows the ADF before it conveys a first document sheet.

As shown in FIG. 7A, in the conveyance path 11 of the ADF 1a, a path length L1 from the first position P1 to the second position P2 is shorter than a document sheet length L0. The document sheet length L0 is a length of the document sheet 91 in the conveyance direction.

Figure 7B:
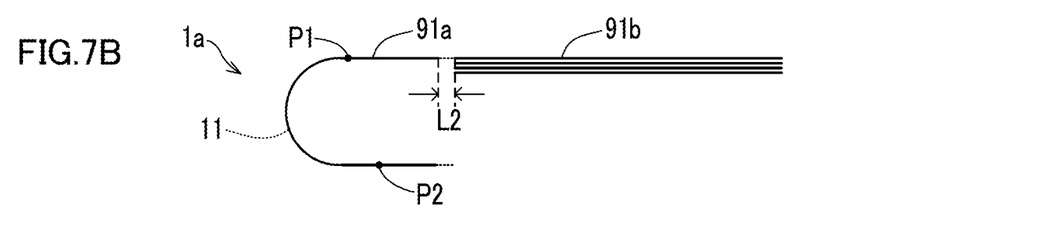
FIG. 7B shows the ADF at a point in time when it starts conveying a second document sheet.

In addition, as shown in FIG. 7B, in the high-speed reading process, the plurality of document sheets 91 are conveyed in sequence at a predetermined inter-paper interval L2.

In the following description, time points at which the second, the third, and the fourth document sheets are started to be conveyed are referred to as the second feed time point, the third feed time point, and the fourth feed time point, respectively.

As shown in FIG. 7B, at the second feed time point, the first document sheet 91a is located at a region that includes the path from the first position P1 to the second position P2 in the conveyance path 11.

Accordingly, the second feed time point is during execution of the processes of steps S204, S205, S207 and S208 on the first document sheet 91a.

Figure 7C:
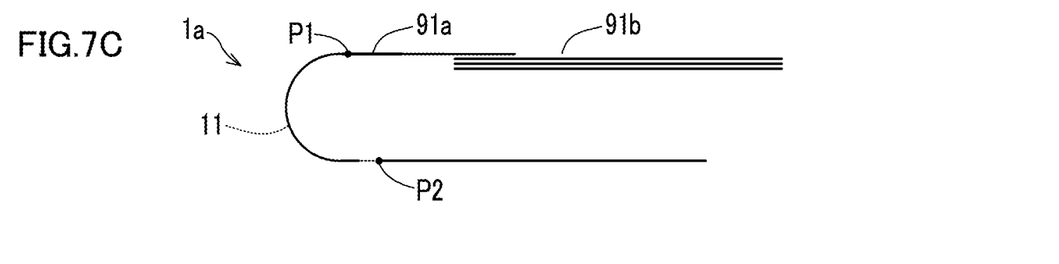
FIG. 7C shows the ADF at a point in time when a rear end of the first document sheet passes a second position in a conveyance path.
Figure 7D:
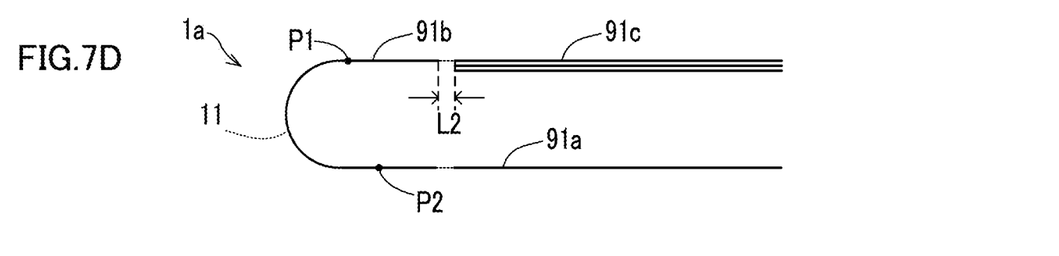
FIG. 7D shows the ADF at a point in time when it starts conveying a third document sheet.

Similarly, as shown in FIG. 7D, at the third feed time point, the second document sheet 91b is located at a region that includes the path from the first position P1 to the second position P2 in the conveyance path 11.

The third feed time point shown in FIG. 7D is a time point when only a short time period has elapsed since the time point shown in FIG. 7C at which the rear end of the first document sheet 91a passed the second position P2. As a result, the third feed time point is during a time period in which the processes of steps S204, S205, S207 and S208 on the first document sheet 91a and the processes of steps S204, S205, S207 and S208 on the second document sheet 91b are executed in parallel.

That is, immediately after the third feed time point, at least six page regions 5a corresponding to the first three document sheets 91 need to be secured in the RAM 5. This means that if six page regions 5a are secured in the RAM 5, it is possible to convey the first three document sheets 91 at the minimum time interval.

Figure 7E:
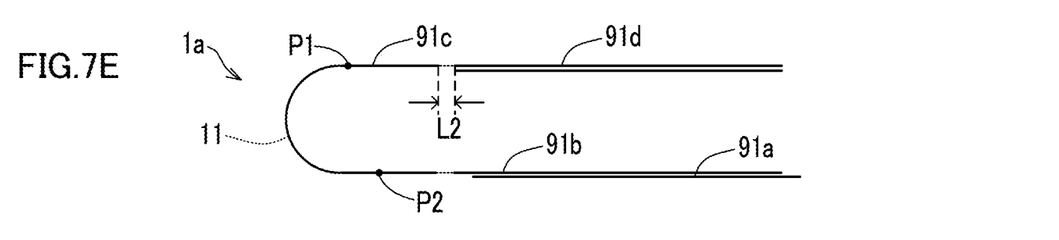
FIG. 7E shows the ADF at a point in time when it starts conveying a fourth document sheet.

In addition, as shown in FIG. 7E, at the fourth feed time point, the third document sheet 91c is located at a region that includes the path from the first position P1 to the second position P2 in the conveyance path 11.

In addition, the fourth feed time point shown in FIG. 7E is a time point when a time period longer than a specific time period has elapsed since the time point shown in FIG. 7C at which the rear end of the first document sheet 91a passed the second position P2, the specific time period being a time period required for the second document sheet 91b that has reached the second position P2, to pass the second position P2.

Accordingly, at the fourth feed time point, two page regions 5a that were used for the first document sheet 91a have become the movement-completion page region. As apparent from this, when six page regions 5a are secured in the secondary storage device 6, it is possible to convey the fourth document sheet 91d without delay following the third document sheet 91c. This also applies to the fifth document sheet 91 and onward.

In addition, compared to a case where two page regions 5a are newly secured in the RAM 5 each time a document sheet 91 is conveyed, the high-speed reading process suppresses the use capacity of the RAM 5 to the minimum.

That is, the image processing apparatus 10 executes the both-side reading process at as high a speed as possible under the restriction of a usable storage region in the RAM 5.

[Memory-Saving Reading Process]

Figure 6:
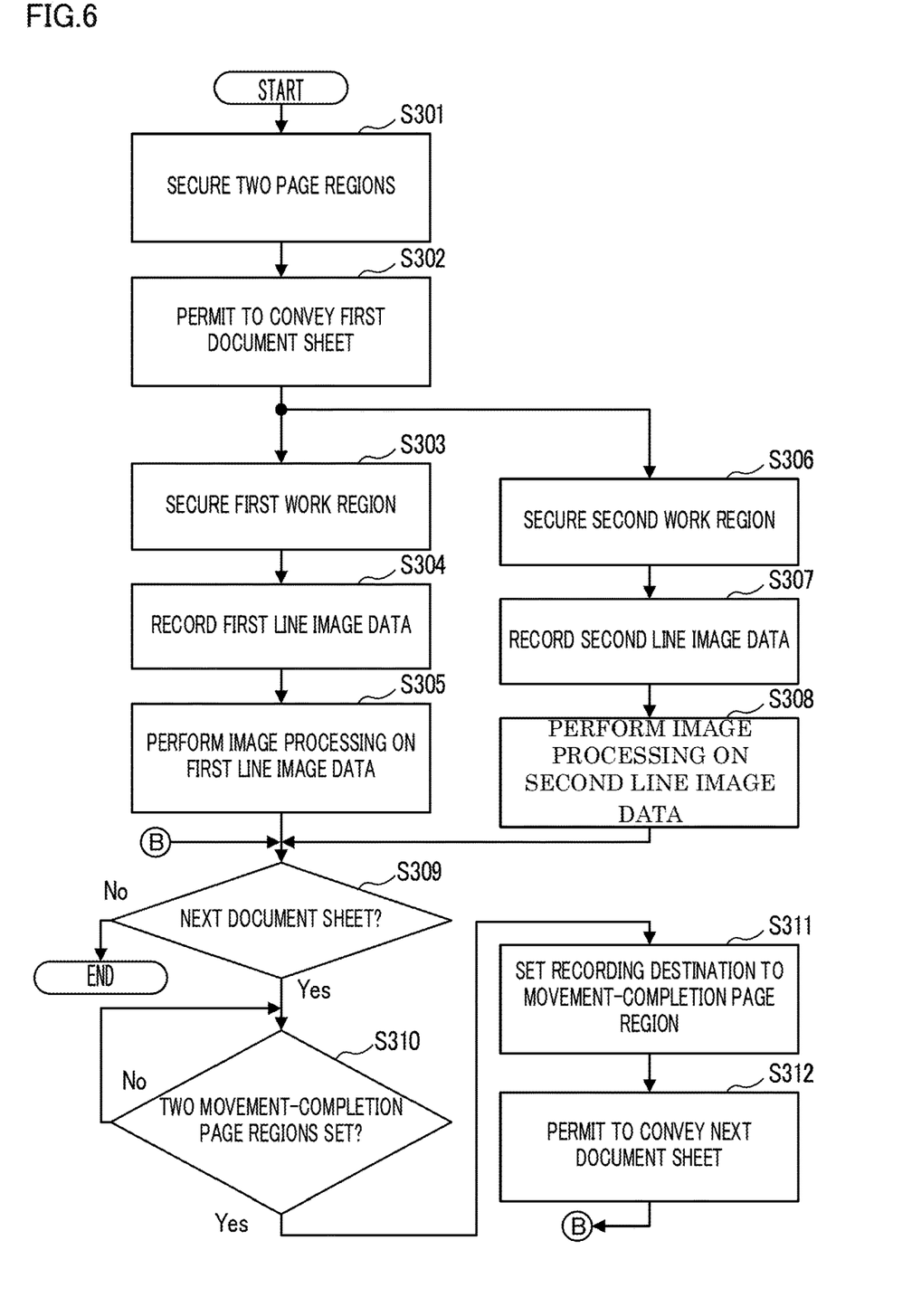
FIG. 6 is a flowchart showing an example of a procedure of a memory-saving reading process in the image processing apparatus according to the embodiment.

Next, an example of the procedure of the memory-saving reading process is described with reference to the flowchart shown in FIG. 6. In the following description, S301, S302, . . . are identification signs representing a plurality of steps of the memory-saving reading process.

<Step S301>

In step S301, in the memory-saving reading process, the region securing portion 41c secures two page regions 5a in the storage region in the RAM 5.

One of the two page regions 5a constitutes the first surface data saving region in which a page of the first adjusted line image data D11 corresponding to the first surface of a document sheets 91 is primarily stored. The other of the two page regions 5a constitutes the second surface data saving region in which a page of the opening port D12 corresponding to the second surface of the document sheets 91 is primarily stored.

After securing the two page regions 5a in the storage region in the RAM 5, the region securing portion 41c moves the process to step S302.

<Step S302>

In response to the securing of the two page regions 5a, the first conveyance control portion 41b permits the ADF 1a to convey the first document sheet 91 among a plurality of document sheets 91. This allows the ADF 1a to convey the first document sheet 91 among document sheets 91 on the document sheet tray 12a.

The first conveyance control portion 41b moves the process from step S302 to step S303 and to step S306.

<Step S303>

In step S303, as in step S203 shown in FIG. 5, the region securing portion 41c secures a first work region 5b in the storage region of the RAM 5 as a region other than the two page regions 5a. Subsequently, the region securing portion 41c moves the process to step S304 and step S305.

<Steps S304 and S305>

In step S304, as in step S204 shown in FIG. 5, the data recording portion 41d executes the first resolution adjustment process and the first data recording process. Furthermore, as in step S205 shown in FIG. 5, the image processing portion 41e executes the first line image processing in parallel with the process of step S304 (S305).

The data recording portion 41d and the image processing portion 41e execute the processes of steps S304 and S305 in sequence with respect to a plurality of pieces of the first adjusted line image data D11 for each of the first surfaces of a plurality of document sheets 91 that are conveyed in sequence. This allows the data recording portion 41d and the image processing portion 41e to execute the processes of steps S304 and S305 with respect to a plurality of pieces of the first adjusted line image data D11 obtained from all document sheets 91 conveyed by the ADF 1a.

On the other hand, the first conveyance control portion 41b executes the process of step S309 that is described below, in parallel with the processes of steps S304 and S305 executed by the data recording portion 41d and the image processing portion 41e.

<Step S306>

In step S306, as in step S206 shown in FIG. 5, the region securing portion 41c secures, in the storage region of the RAM 5, the second work region 5c as a region other than the two page regions 5a and the first work region 5b. Subsequently, the region securing portion 41c moves the process to step S307.

<Steps S307 and S308>

In step S307, as in step S207 shown in FIG. 5, the data recording portion 41d executes the second resolution adjustment process and the second data recording process. Furthermore, in step S308, as in step S208 shown in FIG. 5, the image processing portion 41e executes the second line image processing in parallel with the process of step S307 (S308).

On the other hand, the second conveyance control portion 41f executes the process of step S309 that is described below, in parallel with the processes of steps S307 and S308 executed by the data recording portion 41d and the image processing portion 41e.

<Step S309>

In step S309, the second conveyance control portion 41f determines whether or not a next document sheet 91 is present on the document sheet tray 12a. The document sheet 91 on the document sheet tray 12a is detected by the placed-document-sheet sensor 14.

Upon determining that the next document sheet 91 is present on the document sheet tray 12a, the second conveyance control portion 41f moves the process to step S310.

On the other hand, upon determining that the next document sheet 91 is not present on the document sheet tray 12a, the second conveyance control portion 41f ends the memory-saving reading process after the processes of steps S304, S305, S307 and S308 end.

<Step S310>

In step S310, the data recording portion 41d waits until two movement-completion page regions are set in the RAM 5. That is, the data recording portion 41d waits until all pieces of the secondary line image data D10 are moved from the two movement-completion page regions to the first work region 5b or the second work region 5c.

After the two movement-completion page regions are set in the RAM 5, the data recording portion 41d moves the process to step S311.

<Step S311>

In step S311, the data recording portion 41d sets a recording destination of the secondary line image data D10 that corresponds to the newly conveyed next document sheet 91, to a movement-completion page region in the RAM 5. Subsequently, the data recording portion 41d moves the process to step S312.

In the first data recording process and the second data recording process executed in steps S304 and S307, the data recording portion 41d stores the secondary line image data D10 corresponding to the newly conveyed next document sheet 91, in the movement-completion page region in the RAM 5.

<Step S312>

In step S312, the second conveyance control portion 41f permits the ADF 1a to convey the next document sheet 91. This allows the ADF 1a to convey the next document sheet 91 among the document sheets 91 on the document sheet tray 12a.

Furthermore, the second conveyance control portion 41f moves the process from step S312 to the step S309.

As described above, when it is determined that the RAM 5 is in the second state, the region securing portion 41c secures two page regions 5a in the storage region of the RAM 5 (S301).

Furthermore, the first conveyance control portion 41b permits the ADF 1a to convey the first document sheet 91 among a plurality of document sheets 91 in response to securing of two page regions 5a (S302).

Furthermore, the data recording portion 41d stores a plurality of pieces of the secondary line image data D10 that are obtained in sequence, in the two page regions 5a in the RAM 5, for each page of a plurality of document sheets 91 (S304, S307).

Furthermore, the image processing portion 41e moves the secondary line image data D10 stored in the page regions 5a in sequence to the first work region 5b and the second work region 5c that are other than the page regions 5a in the RAM 5 (S305, S308).

Furthermore, the image processing portion 41e performs predetermined data processing on the secondary line image data D10 in the first work region 5b and the second work region 5c, and transfers the output image data D20 on which the data processing has been performed, to other devices (S305, S308).

Subsequently, each time all pieces of the secondary line image data D10 are moved from the two page regions 5a, the second conveyance control portion 41f permits the ADF 1a to convey the next document sheet 91 with respect to the second document sheet 91 and onward (S312).

Accordingly, when it is determined that the RAM 5 is in the second state, the CPU 4 minimizes the use capacity of the RAM 5.

First Application Example

Portions of the above-described image processing apparatus 10 other than the image forming device 2 may constitute the image reading device 100 as a final product.

Second Application Example

In addition, in the image processing apparatus 10, the first reading device 1b and the second reading device 1c may directly output the first adjusted line image data D11 and the second adjusted line image data D12 that have been adjusted to have the specified resolution, respectively. In this case, the data recording portion 41d primarily stores the secondary line image data D10 output from the first reading device 1b and the second reading device 1c, in the page regions 5a in the RAM 5.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image reading device comprising:
   a document sheet conveyance device configured to convey a plurality of document sheets in sequence along a conveyance path;
   two reading devices configured to read images from two surfaces of each of the document sheets at different positions in the conveyance path and output a plurality of pieces of line image data corresponding to the two surfaces in sequence, respectively;
   a volatile memory configured to primarily store the plurality of pieces of line image data whose resolution has been adjusted to a predetermined specified resolution; and
   a processor configured to execute data processing while accessing the volatile memory, wherein
   the processor includes:
      a region securing portion configured to secure six page regions in a storage region of the volatile memory, each of the six page regions being configured to store line image data of one page of a document sheet;
      a first conveyance control portion configured to permit the document sheet conveyance device to convey first three document sheets among the plurality of document sheets in response to securing of the six page regions;
      a data recording portion configured to store plural pieces of the line image data that are obtained in sequence, in the six page regions for each page of the plurality of document sheets;
      an image processing portion configured to move the plural pieces of the line image data in sequence from the page regions to a work region that is provided in the storage region of the volatile memory as a region other than the page regions, generate post-processing data by performing predetermined data processing on the plural pieces of the line image data in the work region to, and transfer the post-processing data to another device;
      a second conveyance control portion configured to permit the document sheet conveyance device to convey a fourth document sheet and onward among the plurality of document sheets one at a time in sequence following conveyance of the first three document sheets; and
      a determination portion configured to determine which of a first state or a second state the volatile memory is in, wherein when six regions corresponding to the specified resolution can be secured in the storage region of the volatile memory, the volatile memory is determined to be in the first state, and otherwise, the volatile memory is determined to be in the second state, wherein
   in a case where the determination portion determines that the volatile memory is in the first state:
      the region securing portion secures the six page regions in the storage region of the volatile memory,
      the first conveyance control portion permits the document sheet conveyance device to convey the first three document sheets in response to securing of the six page regions, and
      the second conveyance control portion permits the document sheet conveyance device to convey the fourth document sheet and onward among the plurality of document sheets one at a time in sequence following conveyance of the first three document sheets, and
   in a case where the determination portion determines that the volatile memory is in the second state:
      the region securing portion secures two page regions in the storage region of the volatile memory,
      the first conveyance control portion permits the document sheet conveyance device to convey a first document sheet among the plurality of document sheets in response to securing of the two page regions, and
      each time all pieces of line image data are moved from the two page regions, the second conveyance control portion permits the document sheet conveyance device to convey a next document sheet with respect to a second document sheet and onward among the plurality of document sheets.

2. An image processing apparatus comprising:
   the image reading device according to claim 1; and
   an image forming device configured to form, on a sheet, an image based on image data obtained by the image reading device.

* * * * *